(12) United States Patent
Tanaka

(10) Patent No.: US 8,250,245 B2
(45) Date of Patent: Aug. 21, 2012

(54) INFORMATION PROCESSING SYSTEM, WITH INFORMATION PROCESSING TERMINAL CAPABLE OF OPERATING IN MULTIPLE OPERATION MODES WHEN CONNECTED TO A HOST DEVICE

(75) Inventor: Dai Tanaka, Shiojiri (JP)

(73) Assignee: Seiko Epson Corporation (JP)

( * ) Notice: Subject to any disclaimer, the term of this patent is extended or adjusted under 35 U.S.C. 154(b) by 439 days.

(21) Appl. No.: 12/059,087

(22) Filed: Mar. 31, 2008

(65) Prior Publication Data

US 2008/0250172 A1    Oct. 9, 2008

(30) Foreign Application Priority Data

Apr. 5, 2007  (JP) ................................. 2007-099390
Jul. 3, 2007   (JP) ................................. 2007-175369

(51) Int. Cl.
*G06F 3/00*        (2006.01)
(52) U.S. Cl. ................. 710/14; 710/8; 710/15; 710/16; 710/62; 710/63; 710/68; 710/74; 710/100; 710/305; 710/313; 710/316; 711/100; 711/103; 709/217; 709/220; 709/221; 709/222
(58) Field of Classification Search .................. None
See application file for complete search history.

(56) References Cited

U.S. PATENT DOCUMENTS

| | | | | |
|---|---|---|---|---|
| 6,058,441 A * | 5/2000 | Shu | .............................. | 710/100 |
| 6,647,434 B1 * | 11/2003 | Kamepalli | ...................... | 710/14 |
| 6,732,218 B2 * | 5/2004 | Overtoom et al. | ............ | 710/313 |
| 7,082,483 B2 * | 7/2006 | Poo | ................................. | 710/68 |
| 7,246,189 B2 * | 7/2007 | Ulenas | ......................... | 710/305 |
| 7,519,743 B2 * | 4/2009 | Yen | ................................. | 710/14 |
| 7,526,580 B2 * | 4/2009 | Uno | ................................. | 710/14 |
| 7,603,567 B2 | 10/2009 | Kanai | .......................... | 713/189 |
| 7,710,937 B2 | 5/2010 | Yoshida | ........................ | 370/342 |
| 7,912,994 B2 * | 3/2011 | Cornwell et al. | ............... | 710/14 |
| 7,949,796 B2 * | 5/2011 | Uno | ................................. | 710/14 |
| 2001/0032280 A1 * | 10/2001 | Osakada et al. | .............. | 710/129 |
| 2003/0217206 A1 * | 11/2003 | Poo | ................................. | 710/68 |
| 2004/0088456 A1 * | 5/2004 | Zhang | ............................ | 710/74 |
| 2005/0021880 A1 * | 1/2005 | Robbin et al. | .................. | 710/15 |
| 2005/0023339 A1 * | 2/2005 | Uno | ................................. | 235/375 |
| 2005/0071520 A1 * | 3/2005 | Hull et al. | ......................... | 710/8 |
| 2005/0204072 A1 * | 9/2005 | Nakagawa | ....................... | 710/8 |

(Continued)

FOREIGN PATENT DOCUMENTS

CN     201203843 Y  *  3/2009

(Continued)

OTHER PUBLICATIONS

'iPhone User's Guide' by Apple Inc., copyright 2008.*

(Continued)

*Primary Examiner* — Steven Snyder
(74) *Attorney, Agent, or Firm* — Harness, Dickey & Pierce, P.L.C.

(57) ABSTRACT

An information processing system includes a host device transmitting an order according to a USB standard and an information processing terminal responding to the order. The information processing terminal includes a storing unit, a first operation unit, a receiver, an operation-mode switch, a first processor, and a first outputting unit. The host device includes a second operation unit, a transmitter, a second processor, and a second outputting unit.

5 Claims, 13 Drawing Sheets

U.S. PATENT DOCUMENTS

| | | | |
|---|---|---|---|
| 2005/0240693 A1* | 10/2005 | Liao et al. | 710/62 |
| 2006/0095602 A1* | 5/2006 | Watanabe | 710/16 |
| 2007/0005847 A1* | 1/2007 | Nagao et al. | 710/62 |
| 2007/0143507 A1* | 6/2007 | Chen et al. | 710/74 |
| 2007/0174520 A1* | 7/2007 | Moon | 710/62 |
| 2007/0180153 A1* | 8/2007 | Cornwell et al. | 710/1 |
| 2008/0147962 A1* | 6/2008 | Diggs et al. | 711/103 |
| 2008/0244123 A1* | 10/2008 | Kadota | 710/74 |
| 2009/0234797 A1* | 9/2009 | Uno | 707/1 |
| 2009/0307380 A1* | 12/2009 | Lee et al. | 710/14 |
| 2009/0319698 A1 | 12/2009 | Kanai | 710/16 |
| 2009/0319803 A1 | 12/2009 | Kanai | 713/189 |
| 2010/0017558 A1* | 1/2010 | Fruin et al. | 711/103 |
| 2010/0017559 A1* | 1/2010 | Fruin et al. | 711/103 |
| 2010/0180064 A1* | 7/2010 | Han | 710/316 |
| 2011/0093556 A1* | 4/2011 | Miyazawa | 709/208 |

FOREIGN PATENT DOCUMENTS

| | | |
|---|---|---|
| JP | 2004-252749 | 9/2004 |
| JP | 2005-318455 | 11/2005 |
| JP | 2005-338955 | 12/2005 |
| JP | 3766429 | 2/2006 |
| WO | WO 2007122453 A1 * | 11/2007 |

OTHER PUBLICATIONS

'iPod Classis User Guide' by Apple Inc., copyright 2008.*
'On-The-Go Supplement to the USB 2.0 Specification' Revision 1.3, Dec. 2006 (can be found in its entirety at http://www.usb.org/developers/docs/USB_OTG_1-3.pdf).*
'Universal Serial Bus Specification' Revision 2.0, Apr. 27, 2000.*
Universal Serial Bus Specification' Revision 2.0, Apr. 27, 2000, pp. 221-226.*

* cited by examiner

|  | USB CONNECTOR CONNECTION | OPERATION MODE SWITCHING ORDER | FILE SYSTEM EXTERNAL MANAGEMENT | FILE SYSTEM INTERNAL MANAGEMENT | MAIN BODY OPERATION | PROCESSING ORDER BY EXTERNAL OPERATION |
|---|---|---|---|---|---|---|
| UNCONNECTED MODE | × | × | × | ○ | ○ | × |
| CONNECTED MODE | ○ | ○ | × | ○ | ○ | × |
| MASS-STORAGE MODE | ○ | ○ | ○ | × | × | × |
| EXTERNAL OPERATION MODE | ○ | ○ | × | ○ | × | ○ |

FIG. 4

INFORMATION PROCESSING SYSTEM, WITH INFORMATION PROCESSING TERMINAL CAPABLE OF OPERATING IN MULTIPLE OPERATION MODES WHEN CONNECTED TO A HOST DEVICE

BACKGROUND

1. Technical Field

The present invention relates to a technique for causing an information processing terminal to operate in plural operation modes.

2. Related Art

As a user-friendly interface, a USB (Universal Serial Bus) standard is widely spread. Recently, this USB standard is used in, for example, a portable music player that plays music, a digital camera that photographs and displays images, and an electronic book in which a book converted into text data can be viewed as well. A terminal implemented with such a USB standard (hereinafter referred to as USB terminal) is connected to a host device, whereby new data can be added to the USB terminal from the host device and the USB terminal can transfer data stored therein to the host device. Japanese Patent No. 3766429 discloses a technique for restricting access from a host device to a USB terminal to prevent a malicious user from committing manipulation of data and illegal copying when the USB terminal is lost.

Incidentally, when such a USB terminal is connected to the host device, the USB terminal transitions to a so-called slave mode and is completely controlled by the host device. Therefore, processing corresponding to operation of a user cannot be executed on the USB terminal side. For example, while the portable music player is connected to the host device, addition and deletion of music data can be performed from the host device but music cannot be played on the portable music player side. Therefore, for example, when new music data is added to the portable music player by using the host device, music based on the music data cannot be played on the portable music player side while the portable music player is kept connected to the host device.

In other words, at the time of a reproduction mode when the USB terminal operates alone, the USB terminal manages a file system of a storage device in the USB terminal itself. On the other hand, in the slave mode, the host device at the USB connection destination manages the file system of the storage device in the USB terminal. In order to prevent inconsistency and breakage of data due to conflict, management of the file system of the storage device in the USB terminal can be performed only from one of the USB terminal side and the host device side. The USB terminal in the past performs this switching of the operation modes by judging presence or absence of connection to the host device. Therefore, when the USB terminal is connected to the host device, processing cannot be executed on the USB terminal side. Moreover, in the slave mode, even if the host device and the USB terminal are connected, it is impossible to operate the USB terminal from the host device to cause the USB terminal side to execute processing. This is user-unfriendly and inconvenient.

SUMMARY

It is an object of the present invention to execute, even in a state in which an information processing terminal such as a USB terminal is connected to a host device, processing corresponding to operation of a user in the information processing terminal. The present invention provides an information processing system including a host device that transmits an order according to a USB (Universal Serial Bus) standard and an information processing terminal that responds to the order, which is transmitted from the host device, according to the USB standard. The information processing system is characterized in that the information processing terminal includes storing unit that stores data, first operation unit that receives operation for instructing processing, receiving unit that receives the order transmitted from the host device according to the USB standard, operation-mode switching unit that switches, when the receiving unit receives an operation mode switching order for ordering the information processing terminal to switch an operation mode of the information processing terminal itself in a state in which the information processing terminal is connected to the host device, the operation mode of the information processing terminal to a first operation mode or a second operation mode according to the operation mode switching order, first processing unit that executes, in the first operation mode, the processing instructed by the operation using the data stored in the storing unit and does not execute, in the second operation mode, the processing instructed by the operation, and first outputting unit that outputs a result of the processing executed by the first processing unit, and the host device includes second operation unit that receives operation for instructing processing, transmitting unit that transmits, when the host device is instructed to switch the operation mode of the information processing terminal by the operation received by the second operation unit, an operation mode switching order for ordering the information processing terminal to switch the operation mode to an instructed operation mode to the information processing terminal according to the USB standard, second processing unit that performs, when processing for the storing unit of the information processing terminal is instructed by the operation received by the second operation unit after the operation mode of the information processing terminal is switched to the second operation mode according to the operation mode switching order transmitted by the transmitting unit, the processing using the data stored in the storing unit, and second outputting unit that outputs a result of the processing executed by the second processing unit.

In the present invention, the transmitting unit of the host device may transmit, when the host device is instructed by the operation received by the second operation unit to switch the operation mode of the information processing terminal to a third operation mode, an operation mode switching order for ordering the information processing terminal to switch the operation mode to the third operation mode to the information processing terminal according to the USB standard. The operation-mode switching unit of the information processing terminal may switch, when the receiving unit receives an operation mode switching order for ordering the information processing terminal to switch the operation mode of the information processing terminal itself to the third operation mode in a state in which the information processing terminal is connected to the host device, the operation mode of the information processing terminal to the third operation mode according to the operation mode switching order. The host device may include ordering unit that orders, when processing for the storing unit by the information processing terminal is instructed by the operation received by the second operation unit after the operation mode of the information processing terminal is switched to the third operation mode according to the operation mode switching order transmitted by the transmitting unit, the information processing terminal to execute the processing. The first processing unit of the information processing terminal may execute the processing ordered by the ordering unit using the data stored in the storing unit.

In the present invention, the information processing terminal may include first primary storing unit that temporarily stores a result of the processing executed by the first processing unit or a history of the processing before causing the storing unit to store the result or the history. The host device may include second primary storing unit that temporarily stores a result of the processing executed by the second processing unit before causing the storing unit to store the result. The first processing unit may cause, when an operation mode switching order for ordering the information processing terminal to switch the operation mode of the information processing terminal to the second operation mode is received by the receiving unit, the storing unit to store the result of the processing or the history of the processing stored in the first primary storing unit. The operation-mode switching unit may switch, after the result of the processing or the history of the processing is stored in the storing unit by the first processing unit, the operation mode of the information processing terminal to the second operation mode. The second processing unit may reflect, when an operation mode switching order for ordering the information processing terminal to switch the operation mode of the information processing terminal from the second operation mode to another operation mode is transmitted by the transmitting unit, the result of the processing stored in the second primary storing unit on the data stored in the storing unit of the information processing terminal. The operation-mode switching unit may switch the operation mode of the information processing terminal from the second operation mode to the another operation mode after the result of the processing is reflected on the data stored in the storing unit of the information processing terminal by the second processing unit.

The present invention provides an information processing terminal that responds to an order, which is transmitted from a host device, according to a USB standard. The information processing terminal is characterized by including storing unit that stores data, operation unit that receives operation for instructing processing, receiving unit that receives the order transmitted from the host device according to the USB standard, operation-mode switching unit that switches, when the receiving unit receives an operation mode switching order for ordering the information processing terminal to switch an operation mode of the information processing terminal itself in a state in which the information processing terminal is connected to the host device, the operation mode of the information processing terminal to a first operation mode or a second operation mode according to the operation mode switching order, processing unit that executes, in the first operation mode, the processing instructed by the operation using the data stored in the storing unit and does not execute, in the second operation mode, the processing instructed by the operation, and outputting unit that outputs a result of the processing executed by the processing unit.

The present invention provides a host device that transmits an order according to a USB standard. The host device is characterized by including operation unit that receives operation for instructing processing, transmitting unit that transmits, when the host device is instructed to switch an operation mode of an information processing terminal by the operation received by the operation unit, an operation mode switching order for ordering the information processing terminal to switch the operation mode to an instructed operation mode to the information processing terminal according to the USB standard, processing unit that performs, when processing for storing unit of the information processing terminal is instructed by the operation received by the operation unit after the operation mode of the information processing terminal is switched to a second operation mode for not executing processing instructed by operation in the information processing terminal according to the operation mode switching order transmitted by the transmitting unit, the processing using data stored in the storing unit, and outputting unit that outputs a result of the processing executed by the processing unit.

BRIEF DESCRIPTION OF THE DRAWINGS

FIG. 4 is a table in which differences among respective operation modes of the information processing terminal 10 are collated;

DESCRIPTION OF EXEMPLARY EMBODIMENTS

[Embodiment]

Figure 1:
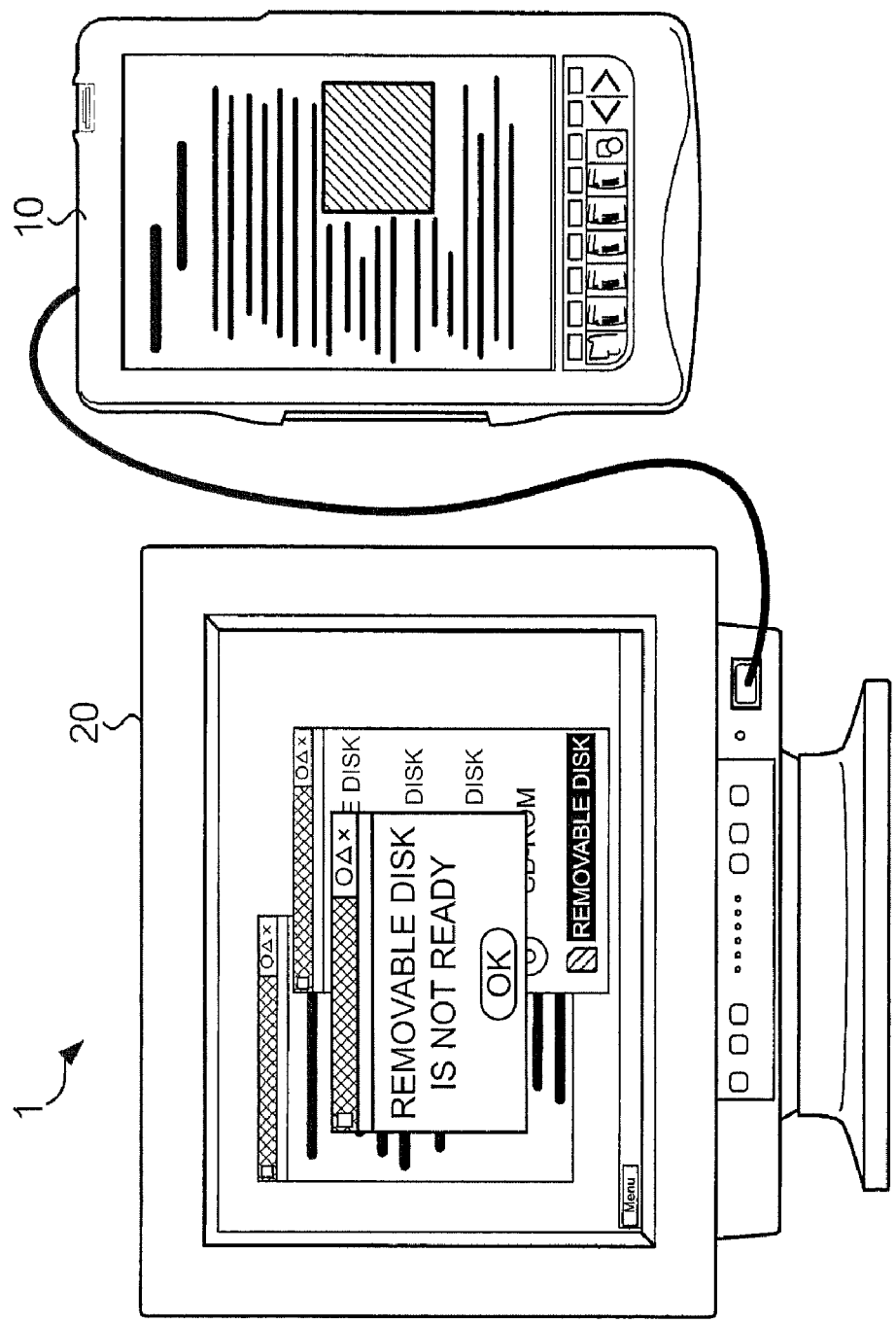
FIG. 1 is a diagram showing a configuration of an information processing system 1.

FIG. 1 is a diagram showing a configuration of an information processing system 1 according to an embodiment of the present invention. As shown in FIG. 1, this information processing system 1 includes an information processing terminal 10 and a host device 20. The host device 20 is, for example, a personal computer and the information processing terminal 10 is, for example, a display device including electronic paper. The information processing terminal 10 has an interface detachably attachable to the host device 20. This interface is connected to the host device 20, whereby the information processing terminal 10 and the host device 20 can communicate with each other. The host device 20 functions as a USB host and the information processing terminal 10 functions as a USB device. The USB host is a device that transmits information (including various orders) to the USB device according to a USB standard. On the other hand, the USB device is a device that executes some response processing complying with the USB standard, for example, execute processing on information transmitted from the USB host. Under the USB standard, this USB device performs processing according to an instruction from the USB host. A function of voluntarily transmitting information from the USB device to the USB host is not defined.

Figure 2:
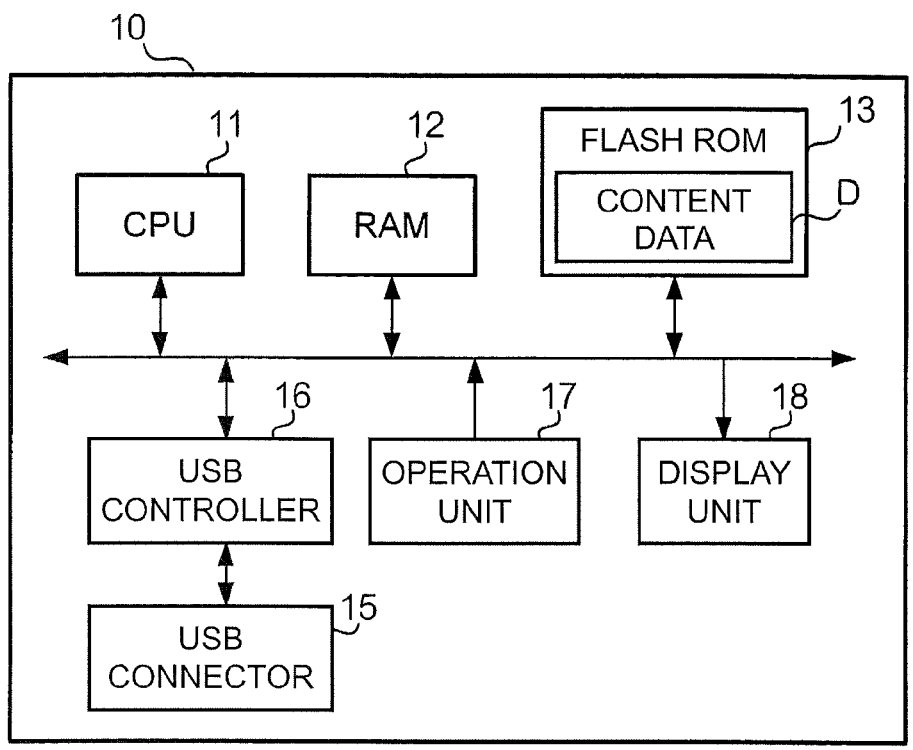
FIG. 2 is a block diagram showing the structure of an information processing terminal 10.

FIG. 2 is a block diagram showing the structure of the information processing terminal 10. As shown in FIG. 2, this information processing terminal 10 includes a CPU (Central Processing Unit) 11, a RAM (Random Access Memory) 12, a flash ROM (Read Only Memory) 13, a USB (Universal Serial Bus) connector 15, a USB controller 16, an operation unit 17, and a display unit 18. The CPU 11 performs various kinds of processing by reading out and executing software stored in the flash ROM 13. The RAM 12 is a work area for the CPU 11. In this RAM 12, for example, a result of the processing executed by the CPU 11 is temporarily stored. The flash ROM 13 is a nonvolatile memory such as an EEPROM (Electrically Erasable and Programmable Read Only Memory) or a flash memory. In this flash ROM 13, software such as an OS (Operating System) for managing the entire information processing terminal 10 and plural content data D are stored. This content data D is data used in the processing by the CPU 11 and is, for example, document data for causing the display unit 18 to display a sentence.

The USB connector 15 is an interface detachably attachable to the host device 20. The USB controller 16 performs transmission and reception of information to and from the host device 20 according to the USB standard under the control by the CPU 11. Consequently, the information processing terminal 10 and the host device 20 are connected to be capable of communicating with each other according to the USB standard. The operation unit 17 includes operation devices such as a pen device and a joystick. The operation unit 17 receives operation for instructing processing by a user and supplies a signal corresponding to the operation to the CPU 11. The display unit 18 is displaying unit employing a cholesteric liquid crystal, a microcapsule type electrophoresis element, or the like. The display unit 18 displays various images under the control by the CPU 11. This display unit 18 has memory properties in that the display unit 18 can continue to display the images even if the supply of electric power is stopped. A processing result of the CPU 11 is outputted by this display unit 18.

Figure 3:
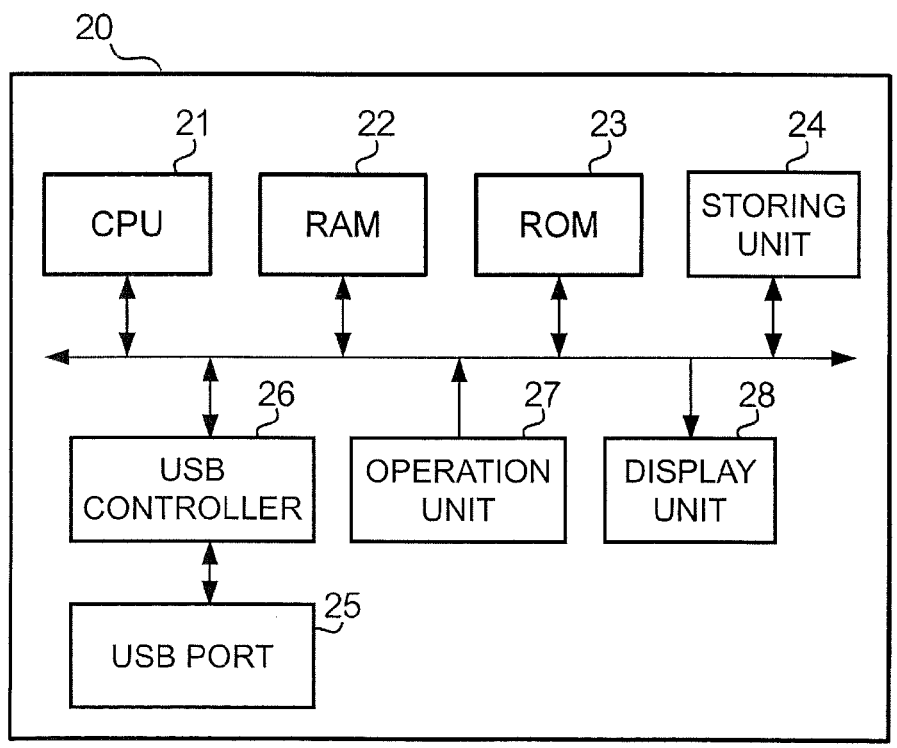
FIG. 3 is a block diagram showing the structure of a host device 20.

FIG. 3 is a block diagram showing the structure of the host device 20. As shown in FIG. 3, this host device 20 includes a CPU 21, a RAM 22, a ROM 23, a storing unit 24, a USB port 25, a USB controller 26, an operation unit 27, and a display unit 28. The CPU 21 performs various kinds of processing by reading out and executing software stored in the ROM 23 or the storing unit 24. The RAM 22 is a work area for the CPU 21. In this RAM 22, for example, a result of the processing executed by the CPU 21 is temporarily stored. The ROM 23 is a read-only nonvolatile memory. In this ROM 23, a program for booting the host device 20 is stored. The storing unit 24 is, for example, a hard disk. In this storing unit 24, an OS for managing the entire host device 20 and a software group including processing order software for ordering the information processing terminal 10 to perform processing are stored.

The USB port 25 is a connection port to which the USB connector 15 of the information processing terminal 10 is connected. The USB controller 26 performs communication with the information processing terminal 10 according to the USB standard under the control by the CPU 21. The operation unit 27 is, for example, a keyboard and a mouse. The operation unit 27 receives operation by the user for instructing processing and supplies a signal corresponding to the operation to the CPU 21. The display unit 28 is, for example, a liquid crystal display. The display unit 28 displays various images under the control by the CPU 21.

Here, operation modes of the information processing terminal 10 are explained.

The information processing terminal 10 operates in any one of three kinds of operation modes, namely, a connected mode (a first operation mode), a mass-storage mode (a second operation mode), and an external operation mode (a third operation mode) in a state in which the information processing terminal 10 is connected to the host device 20. The connected mode is an operation mode for not accepting processing for the flash ROM 13 from the host device 20. The mass-storage mode is an operation mode for accepting processing for the flash ROM 13 from the host device 20. The external operation mode is an operation mode for accepting a processing order for the flash ROM 13 from the host device 20. More specifically, the operation modes are as described below.

The connected mode is an operation mode for not accepting processing for the flash ROM 13 from the host device 20 and, on the other hand, executing processing that the user instructs using the operation unit 17 of the information processing terminal 10. However, even in this connected mode, when a command (order) for instructing switching to another operation mode is transmitted from the host device 20, the information processing terminal 10 accepts the command and executes operation mode switching processing as instructed by the command. In other words, the information processing terminal 10 in the connected mode executes operation mode switching processing according to the command for instructing switching to another operation mode transmitted from the host device 20 in a state in which the information processing terminal 10 is connected to the host device 20 via a USB cable. However, in the processing other than the operation mode switching processing, the information processing terminal 10 performs processing equivalent to processing performed when the information processing terminal 10 operates alone.

Next, the mass-storage mode is an operation mode in which the host device 20 directly accesses the flash ROM 13 of the information processing terminal 10 and executes processing. In this mass-storage mode, since the information processing terminal 10 is controlled by the host device 20, even if the operation unit 17 of the information processing terminal 10 is operated by the user, processing instructed by the operation is not executed. In this way, the information processing terminal 10 in the mass-storage mode applies processing of a mass storage, which is the same as that of a normal storage medium such as a removable disk drive, to the host device 20. However, in the mass-storage mode, when a command for instructing switching to another operation mode is transmitted from the host device 20, the information processing terminal 10 performs operation mode switching processing according to the command.

The external operation mode is an operation mode in which the information processing terminal 10 executes processing instructed by user operation in the host device 20 (i.e., an external device for the information processing terminal 20). In this external operation mode, in order to prevent conflict between operation on the information processing terminal 10 side and operation on the host device 20 side, even if the operation unit 17 of the information processing terminal 10 is operated by the user, processing instructed by the operation is not executed. In other words, the operation on the host device 20 side is given priority. This external operation mode is different from the mass-storage mode in that, whereas, in the external operation mode, when the host device 20 orders the information processing terminal 10 to perform processing, the information processing terminal 10 executes the processing using resources (the RAM 12, etc.) of the information processing terminal 10 itself according to the order and provides the host device 20 with a result of the processing or performs display on the display unit 18 thereof, in the mass-storage, the host device 20 itself accesses the flash ROM 13 and executes processing using resources (the RAM 22, etc.) of the host device 20.

FIG. 4 is a table in which differences among operations of the information processing terminal 10 in the respective operation modes are collated. "USB connector connection" in the figure is an item indicating whether the USB connector 15 of the information processing terminal 10 and the USB port 25 of the host device 20 are connected. "O" indicates that the USB connector 15 and the USB port 25 are connected. "X" indicates that the USB connector 15 and the USB port 25 are not connected. "Operation mode switching order" is an item indicating whether operation mode switching processing is executed by the information processing terminal 10 according to a command for instructing switching to another operation mode transmitted from the host device 20. "O" indicates that the operation mode switching processing is executed and "X" indicates that the operation mode switching processing is not executed. "File system external management" is an item indicating whether an operation for accepting a processing order to the flash ROM 13 by the host device 20, i.e., an operation in a mass-storage class is performed. "O" indicates that the operation in the mass-storage class is performed and "X" indicates that the operation in the mass-storage class is not performed. "File system internal management" is an item indicating whether the CPU 11 of the information processing terminal 10 performs management of a file system of the flash ROM 13. "O" indicates that the CPU 11 performs the management of the file system and "X" indicates that the CPU 11 does not perform the management of the file system. "Main body operation" is an item indicating whether the information processing terminal 10 executes processing according to operation received by the operation unit 17 of the information processing terminal 10 itself. "O" indicates that the information processing terminal 10 executes the processing and "X" indicates that the information processing terminal 10 does not execute the processing. "Processing order by external operation" is an item indicating whether the information processing terminal 10 executes processing according to a processing order instructed by operation received by the operation unit 27 of the host device 20. "O" indicates that the information processing terminal 10 executes the processing and "X" indicates that the information processing terminal 10 does not execute the processing.

When the USB connector 15 is not connected to the USB port 25 of the host device 20, the information processing terminal 10 operates in the "unconnected mode". As shown in the figure, in the "unconnected mode", "USB connector connection" is "X", "operation mode switching order" is "X", "file system external management" is "X", "file system internal management" is "O", "main body operation" is "O", and "processing order by external operation" is "X". In other words, the behavior of the information processing terminal 10 in the "unconnected mode", is as described below. First, in the unconnected mode, the USB connector 15 of the information processing terminal 10 and the USB port 25 of the host device 20 are not connected. Therefore, in the information processing terminal 10 at the time of the unconnected mode, all of the operation mode switching processing complying with the command for instructing switching to another operation mode transmitted from the host device 20, the operation in the mass-storage class, and the processing complying with the processing order instructed by the operation of the operation unit 27 of the host device 20 are not performed. In the information processing terminal 10 at the time of this unconnected mode, the file system of the flash ROM 13 is managed by the CPU 11 that operates according to the OS and processing instructed by the operation of the operation unit 17 is executed. In short, the information processing terminal 10 operates standalone.

Figure 5:
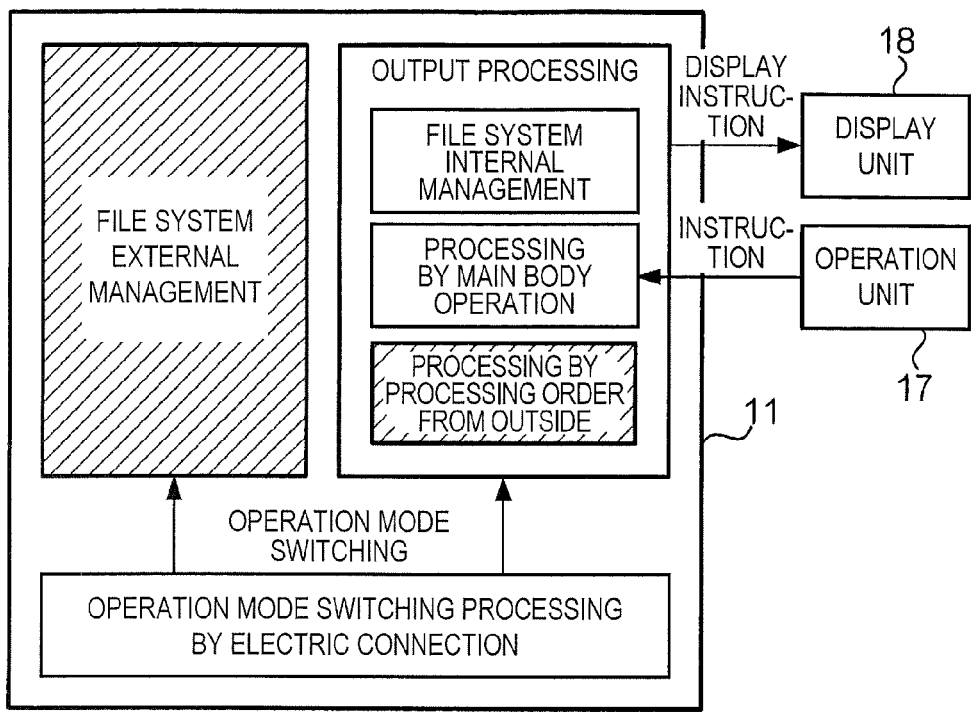
FIG. 5 is a diagram for explaining processing performed in the information processing terminal 10 at the time of an unconnected mode.

FIG. 5 is a diagram for explaining processing executed in the information processing terminal 10 at the time of the unconnected mode. Respective kinds of processing shown in the figure are realized by the CPU 11 of the information processing terminal 10 reading out a software group, which should be executed in the unconnected mode, from the flash ROM 13 and executing the software group. Hatched portions in the figure indicate processing that is not executed at the time of the unconnected mode.

As described above, in the unconnected mode, the information processing terminal 10 operates standalone. However, if the USB connector 15 of the information processing terminal 10 and the USB port 25 of the host device 20 are connected in this mode, the CPU 11 detects an electric connection state thereof, whereby the unconnected mode is switched to another operation mode. In this unconnected mode, management of the file system of the flash ROM 13 is performed by the CPU 11 and external management of the file system, i.e., the operation in the mass-storage class is not performed. In the unconnected mode, processing instructed by the operation of the operation unit 17 is executed. Consequently, for example, processing for causing the display unit 18 to display an image is performed.

Subsequently, as shown in FIG. 4, in the "connected mode", "USB connector connection" is "O", "operation mode switching order" is "O", "file system external management" is "X", "file system internal management" is "O", "main body operation" is "O" and "processing order by external operation" is "X". In other words, the behavior of the information processing terminal 10 in the "connected mode" is as described below. First, in the connected mode, the USB connector 15 of the information processing terminal 10 and the USB port 25 of the host device 20 are connected. In the information processing terminal 10 at the time of the connected mode, operation mode switching processing is executed according to a command for instructing switching to another operation mode transmitted from the host device 20. In the information processing terminal 10 at the time of the connected mode, as in the case of the unconnected mode described above, the operation in the mass-storage class is not performed. The file system of the flash ROM 13 is managed by the CPU 11 that operates according to the OS. In this information processing terminal 10, processing instructed by the operation of the operation unit 17 is executed but processing ordered by the operation of the operation unit 27 of the host device 20 is not executed.

Figure 6:
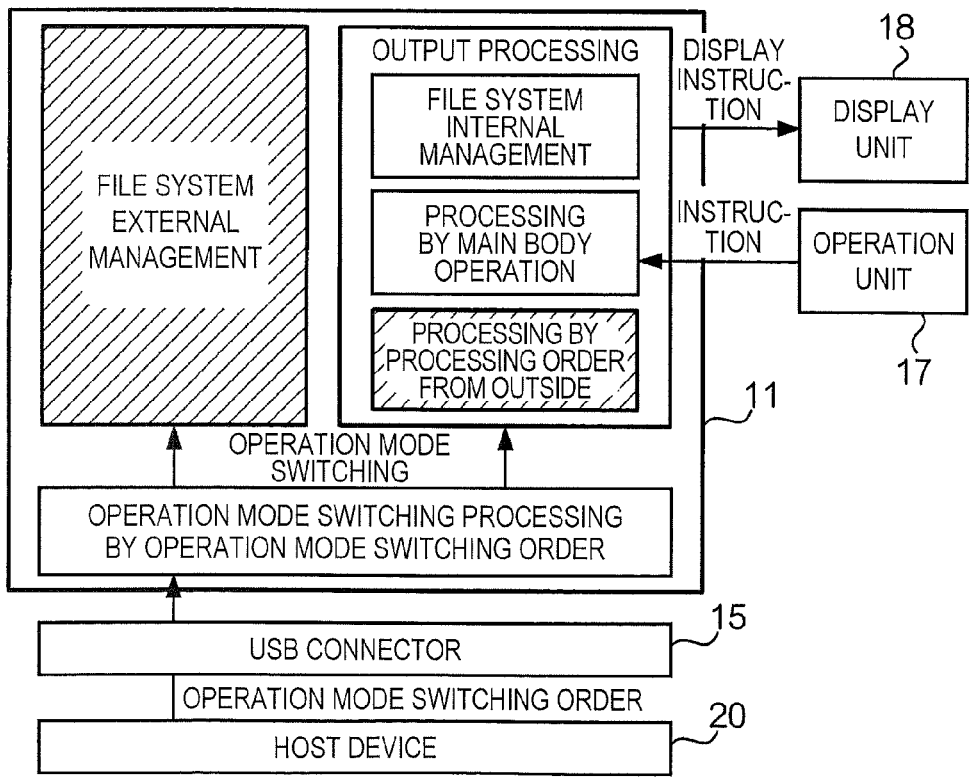
FIG. 6 is a diagram for explaining processing in the information processing terminal 10 at the time of a connected mode.

FIG. 6 is a diagram for explaining processing executed in the information processing terminal 10 at the time of the connected mode. The respective kinds of processing shown in the figure are realized by the CPU 11 of the information processing terminal 10 reading out a software group, which is executed in the connected mode, from the flash ROM 13 and executing the software group. Hatched portions in the figure indicate processing that is not executed at the time of the connected mode.

As shown in the figure, in the connected mode, operation mode switching processing is executed according to an operation mode switching order, which is a command for instructing switching to another operation mode, transmitted from the host device 20. In this connected mode, the CPU 11 of the information processing terminal 10 performs the management of the file system of the flash ROM 13 and the external management of the file system and the operation in the mass-storage class are not performed. This "external management of the file system is not performed" specifically unit that the information processing terminal 10 replies to an inquiry from the host device 20 that a device type of the information processing terminal 10 itself is a removable disk and further notifies the host device 20 that a storage medium such as a medium is not present in the removable disk. Consequently, it is possible to pretend that a storage medium is not present in the removable disk connected to the host device 20. The host device 20 does not access the removable disk in which a storage medium is not present. Therefore, the information processing terminal 10 can prevent the processing order to the flash ROM 13 by the host device 20 from being received. In this connected mode, as in the case of the unconnected mode, processing instructed by the operation of the operation unit 17 is executed. Consequently, for example, processing for causing the display unit 18 to display an image is performed.

Subsequently, as shown in FIG. 4, in the "mass-storage mode", "USB connector connection" is "O", "operation mode switching order" is "O", "file system external management" is "O", "file system internal management" is "X", "main body operation" is "X", and "processing order by external operation" is "X". In other words, the behavior of the information processing terminal 10 in the "mass-storage mode" is as described below. First, in the mass-storage mode, as in the case of the of the connected mode described above, the USB connector 15 of the information processing terminal 10 and the USB port 25 of the host device 20 are connected. In the information processing terminal 10 at the time of the mass-storage mode, the operation mode switching processing is executed according to a command for instructing switching to another operation mode transmitted from the host device 20. In this mass-storage mode, the external management of the file system, i.e., the operation in the mass-storage class is received. The management of the file system of the flash ROM 13 by the CPU 11 is not performed. Moreover, in the mass-storage mode, the processing complying with the operation of the operation unit 17 and the processing ordered by the operation of the operation unit 27 of the host device 20 are not executed.

Figure 7:
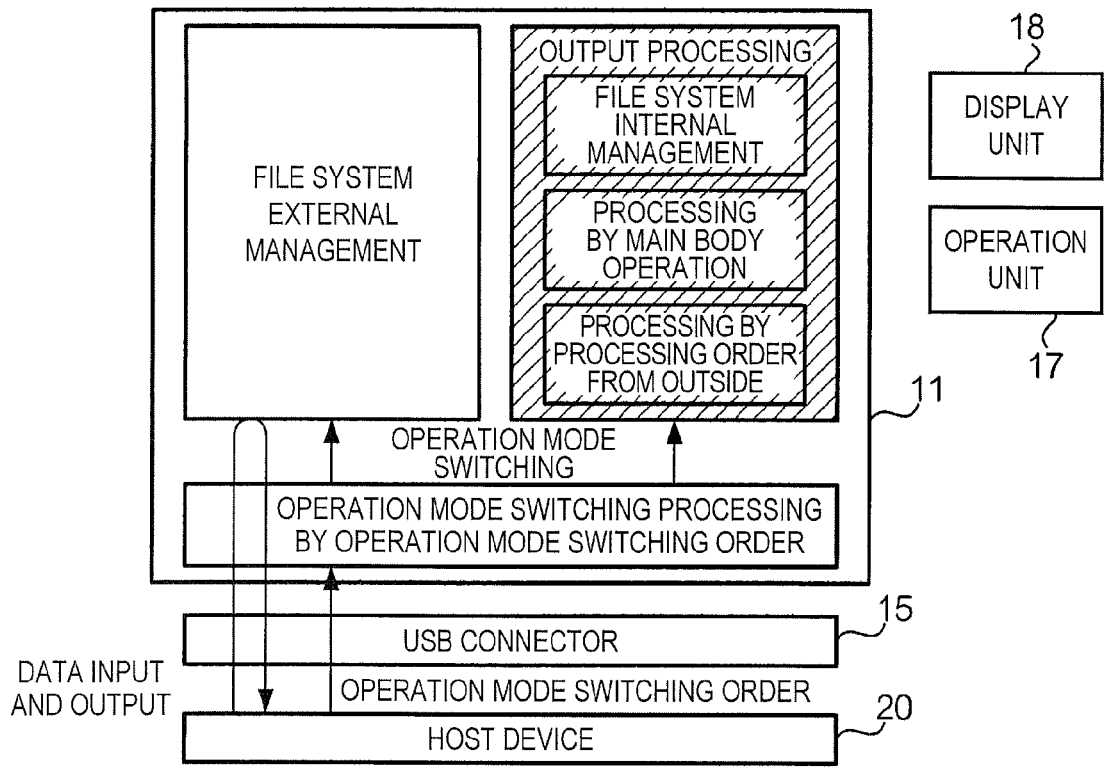
FIG. 7 is a diagram for explaining processing performed in the information processing terminal 10 at the time of a mass-storage mode.

FIG. 7 is a diagram showing processing executed in the information processing terminal 10 at the time of the mass-storage mode. Respective kinds of processing shown in the figure is realized by the CPU 11 of the information processing terminal 10 reading out a software group, which should be executed in the mass-storage mode, from the flash ROM 13 and executing the software group. Hatched portions in the figure indicate processing that is not executed at the time of the mass-storage mode.

As shown in the figure, in the mass-storage mode, as in the case of the connected mode described above, the operation mode switching processing is executed according to the operation mode switching order. In the mass-storage mode, the external management of the file system, i.e., the operation in the mass-storage class is performed and the management of the file system of the flash ROM 13 by the CPU 11 is not performed. In the mass-storage mode, the processing instructed by the operation of the operation unit 17 and the processing ordered by the operation of the operation unit 27 of the host device 20 are not executed. For example, even if processing for displaying a certain image on the display unit 18 is instructed by operation received by the operation unit 17, the CPU 11 does not execute the processing.

Subsequently, as shown in FIG. 4, in the "external operation mode", "USB connector connection" is "O", "operation mode switching order" is "O", "file system external management" is "X", "file system internal management" is "O", "main body operation" is "X", and "processing order by external operation" is "O". In other words, the behavior of the information processing terminal 10 in the "external operation mode" is as described below. In the external operation mode, as in the case of the connected mode described above, the USB connector 15 of the information processing terminal 10 and the USB port 25 of the host device 20 are connected. In the information processing terminal 10 at the time of the external operation mode, the operation mode switching processing complying with the command for instructing switching to another operation mode from the host device 20 is executed. In the information processing terminal 10 at the time of the external operation mode, as in the case of the connected mode described above, the external management of the file system, i.e., the operation in the mass-storage class is not performed. The CPU 11 that operates according to the OS manages the file system of the flash ROM 13. The processing up to here is the same as the operation in the case of the connected mode. However, in this external operation mode, the processing instructed by the operation received by the operation unit 17 is not executed and the processing ordered by the operation received by the operation unit 27 of the host device 20 is executed.

Figure 8:
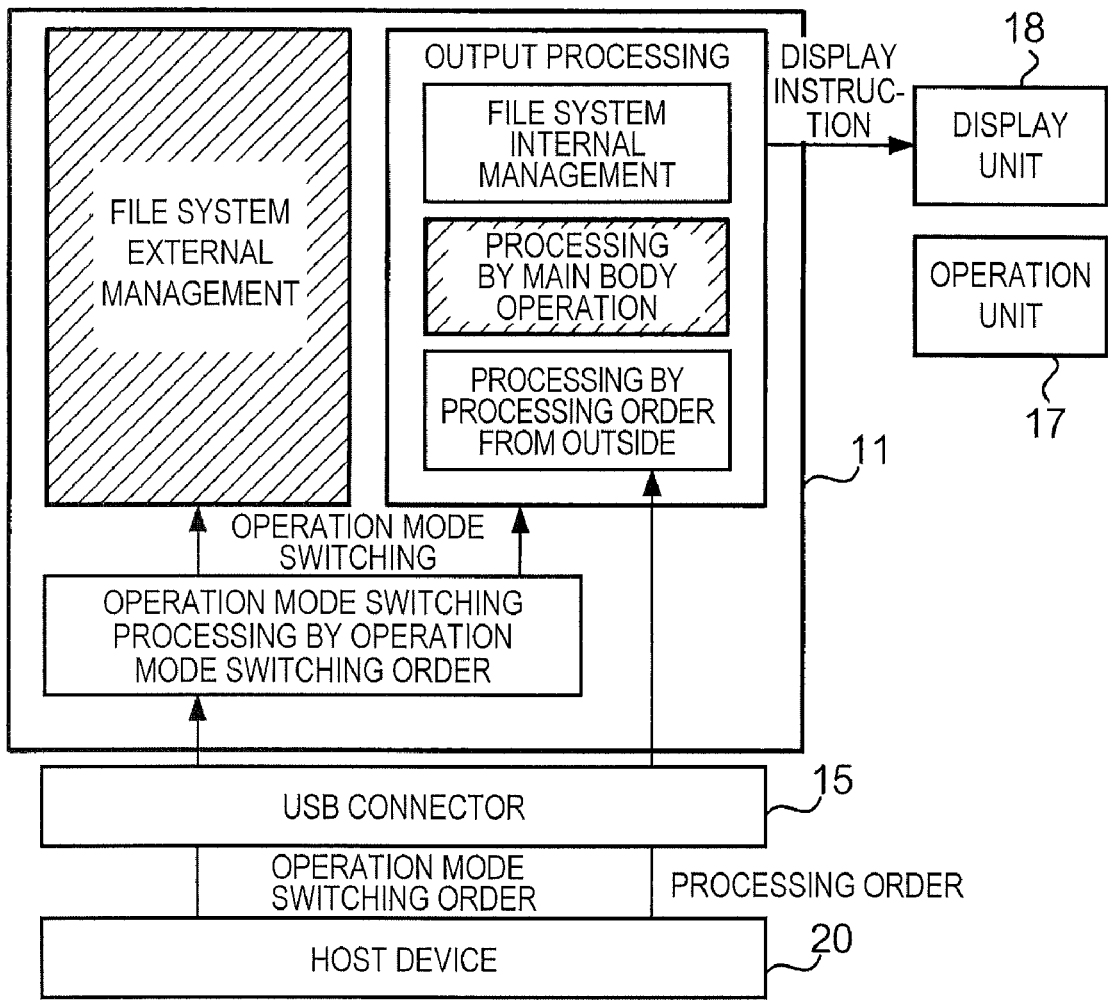
FIG. 8 is a diagram for explaining processing performed in the information processing terminal 10 at the time of an external operation mode.

FIG. 8 is a diagram showing processing executed in the information processing terminal 10 at the time of the external operation mode. Respective kinds of processing shown in the figure is realized by the CPU 11 of the information processing terminal 10 reading out a software group, which should be executed in the external operation mode, from the flash ROM 13 and executing the software group. Hatched portions in the figure indicate processing that is not executed at the time of the external operation mode.

As shown in the figure, in the external operation mode, as in the case of the connected mode described above, the operation mode switching processing is executed according to the operation mode switching order transmitted from the host device 20. In this external operation mode, as in the case of the connected mode described above, the CPU 11 of the information processing terminal 10 performs management of the file system of the flash ROM 13 and the external management of the file system, i.e., the operation in the mass-storage class is not performed. In other word, the operation mode switching processing and the management of the file system are performed as in the connected mode described above. However, in this external operation mode, the processing instructed by the operation received by the operation unit 17 is not executed and the processing complying with the processing order ordered by the operation received by the operation unit 27 of the host device 20 is performed. The CPU 21 of the host device 20 orders the information processing terminal 10 to perform the processing instructed by the operation received by the operation unit 27 according to the processing order software stored in the storing unit 24. For example, the host device 20 causes the display unit 18 of the information processing terminal 10 to display the file stored in the flash ROM 13 or orders processing for turning over pages of contents displayed on the display unit 18. In this external operation mode, the host device 20 cannot directly access the flash ROM 13 of the information processing terminal 10. Therefore, the host device 20 requests the information processing terminal 10 to transmit a list of files stored in the flash ROM 13 and the information processing terminal 10 transmits the list of the files to the host device 20 in response to the request, whereby an order for processing from the host device 20 is performed.

The connected mode, the mass-storage mode, and the external operation mode can be mutually switched according to operation by the user. However, to prevent inconvenience from occurring in processing, transition among the operation modes may be limited.

Next, operations according to this embodiment are explained.

Figure 9:
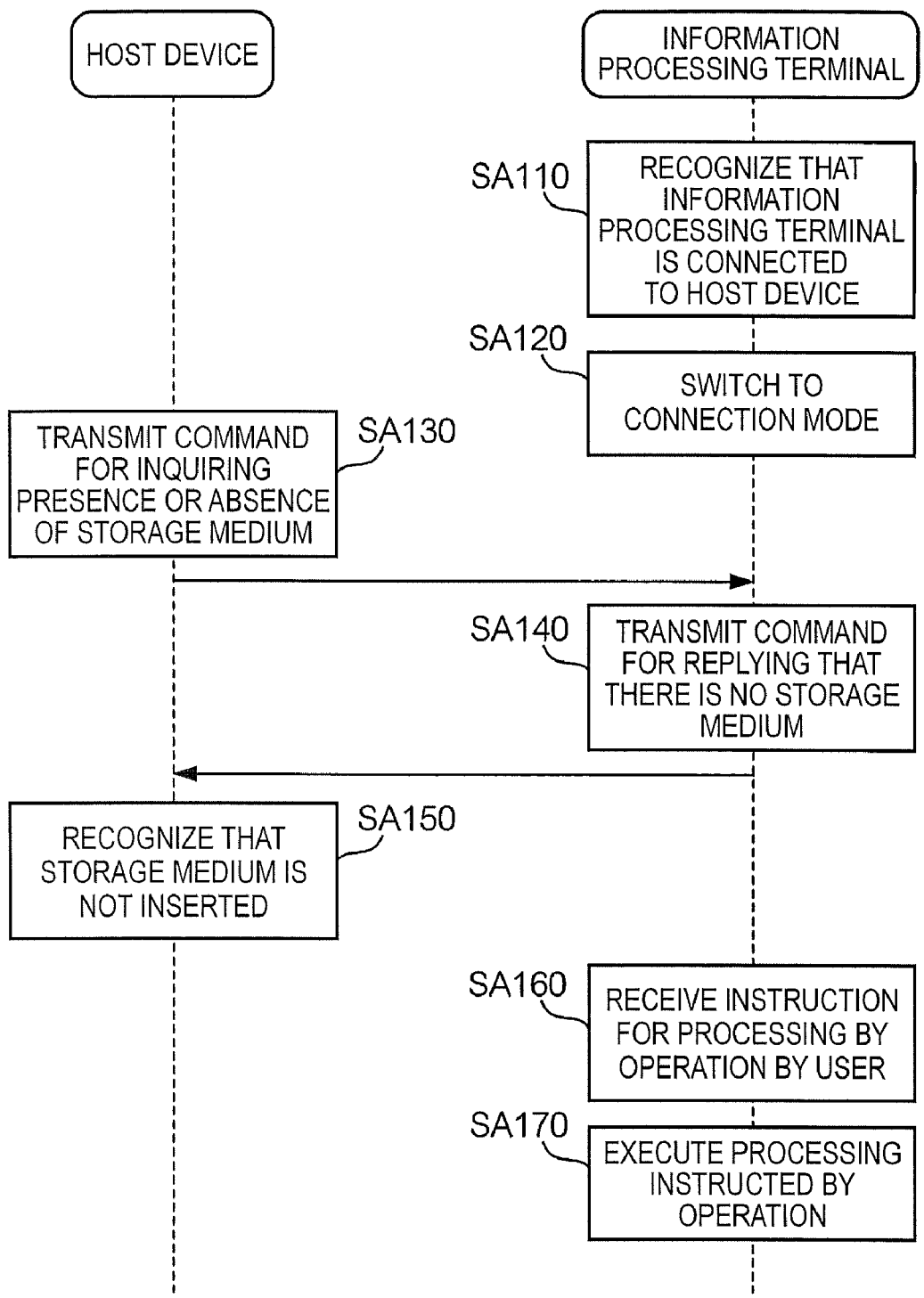
FIG. 9 is a sequence chart showing operations in the connected mode.

First, operations in the connected mode are explained with reference to a sequence chart shown in FIG. 9. When the USB connector 15 of the information processing terminal 10 is connected to the USB port 25 of the host device 20, the CPU 11 of the information processing terminal 10 detects a voltage supplied from the USB port 25 by the connection. The CPU 11 recognizes, by detecting this voltage, that the information processing terminal 10 is connected to the host device 20 (step SA110) and switches an operation mode of the information processing terminal 10 to the connected mode (step SA120).

On the other hand, when the information processing terminal 10 is connected, the CPU 21 of the host device 20 recognizes the information processing terminal 10 as a removable disk and transmits a command for inquiring whether a storage medium such as a medium is inserted in the removable disk to the information processing terminal 10 (step SA130). In order to virtually show the information processing terminal 10 as the removable disk in which a storage medium is not inserted, the CPU 11 of the information processing terminal 10 transmits a command for replying that a storage medium is not inserted in response to the command, which is transmitted from the host device 20, to the host device 20 (step SA140).

When the command for replying that a storage medium is not inserted is transmitted from the information processing terminal 10, the CPU 21 of the host device 20 recognizes that a storage medium is not inserted in the information processing terminal 10 (step SA150). According to the OS, the CPU 21 of the host device 20 does not request access to the removable disk in which a storage medium is not inserted. Therefore, the information processing terminal 10 can reject access to the flash ROM 13 by the CPU 21 of the host device 20 by performing such a response.

Figure 10:
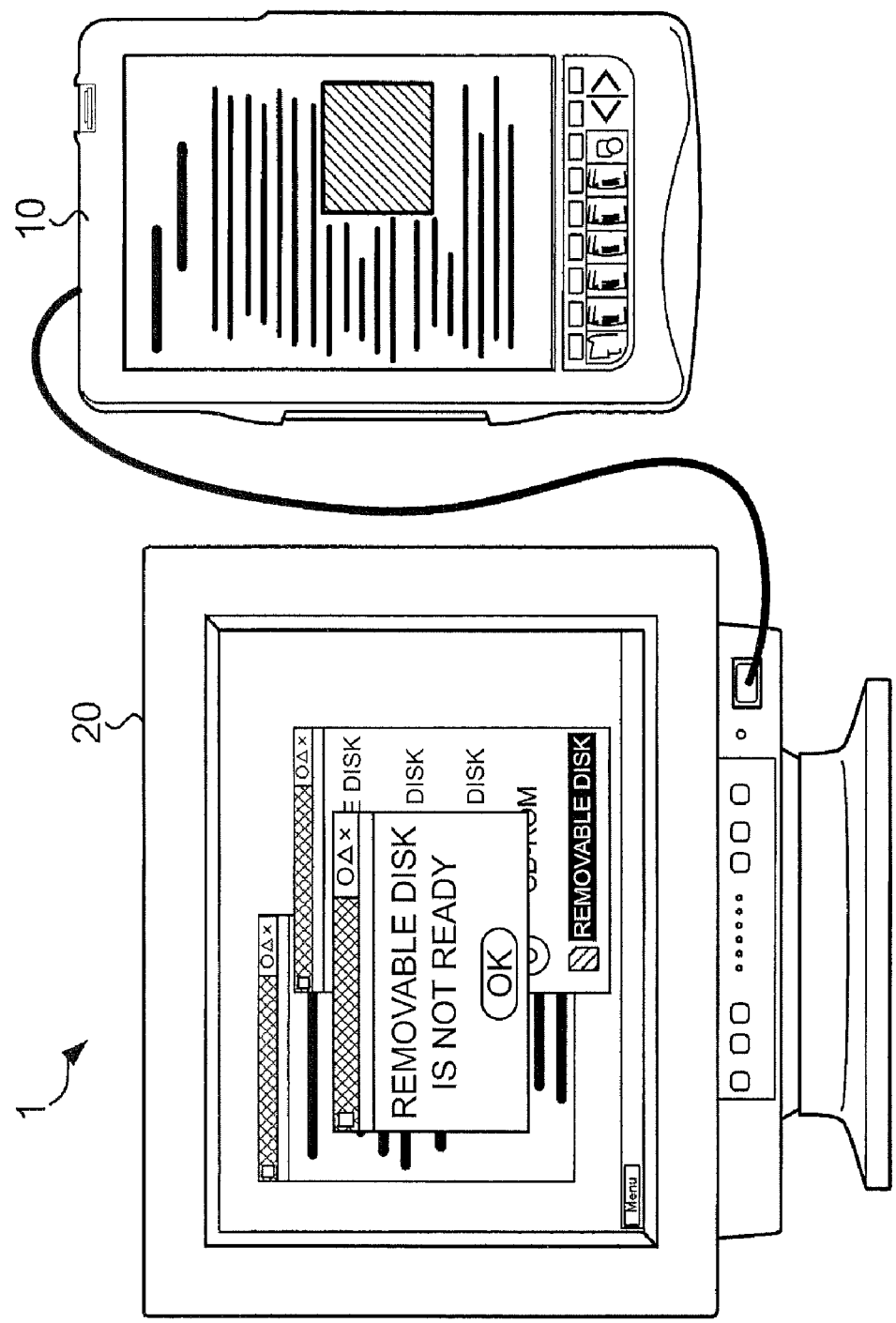
FIG. 10 is a diagram showing a screen at the time when access to a flash ROM 13 is instructed.

When the information processing terminal 10 is in this connected mode, for example, even if the operation unit 27 of the host device 20 is operated by the user and access to the flash ROM 13 of the information processing terminal 10 is instructed, the CPU 21 of the host device 20 does not perform a request for the access. FIG. 10 is a diagram showing a screen displayed on the display unit 28 of the host device 20 at this point. When the information processing terminal 10 is in the connected mode, if access to the flash ROM 13 of the information processing terminal 10 is instructed by the user, the CPU 21 of the host device 20 causes the display unit 28 to display a message "removable disk is not ready" as shown in the figure and notifies the user that the flash ROM 13 cannot be accessed.

On the other hand, when the operation unit 17 of the information processing terminal 10 is operated by the user, this information processing terminal 10 executes processing instructed by the operation by the user as described above. For example, when operation for instructing processing for causing the display unit 18 to display certain content data D is performed, the CPU 11 of the information processing terminal 10 receives an instruction for processing by the operation by the user (step SA160 in FIG. 9). Then, this CPU 11 executes the processing instructed by the operation by the user, i.e., processing for reading out the content data D from the flash ROM 13 and causing the display unit 18 to display the content data D (step SA170). Consequently, the content data D designated by the user is displayed on the display unit 18.

Figure 11:
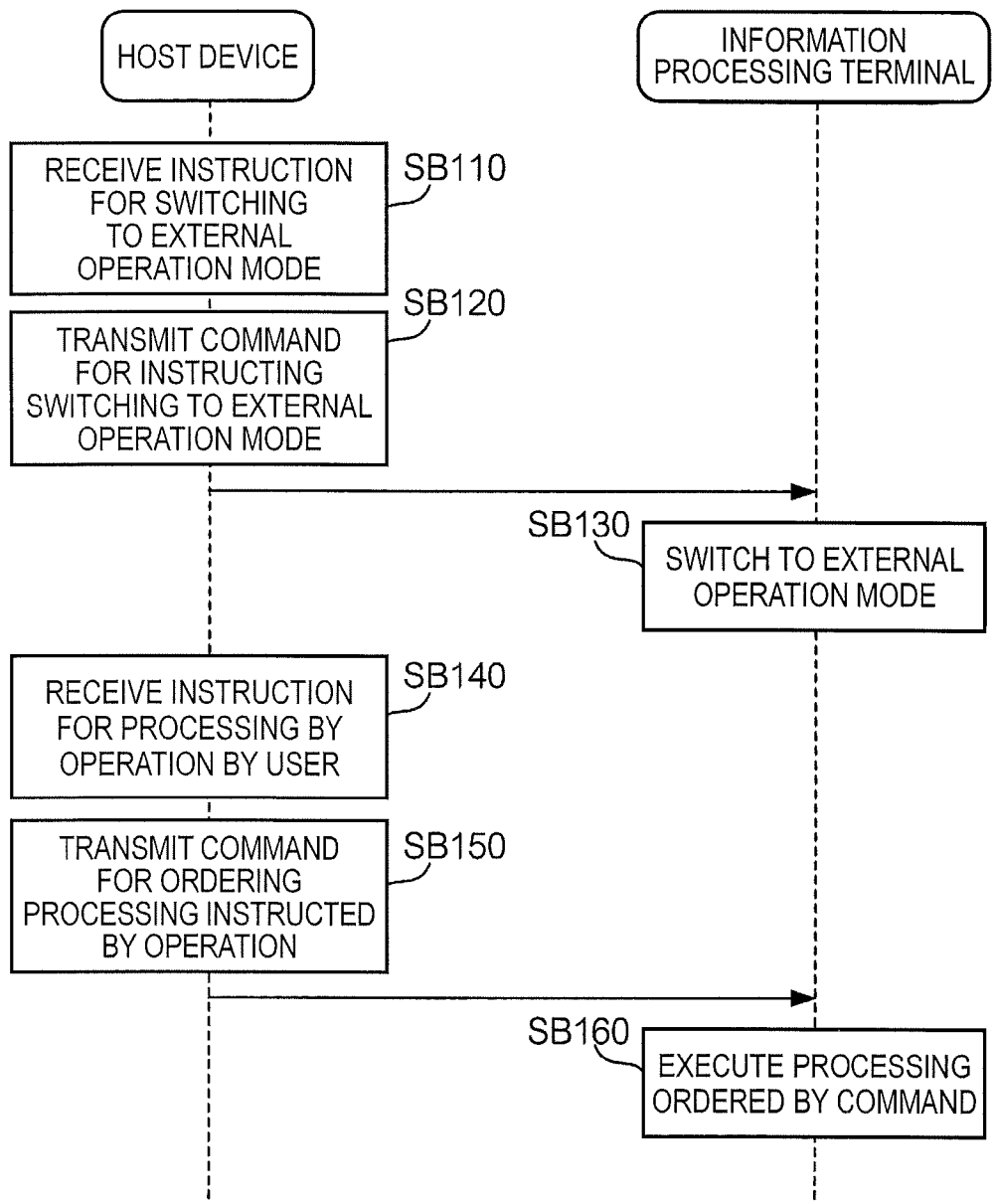
FIG. 11 is a sequence chart showing operations in an external operation mode.

Subsequently, operations in the external operation mode are explained with reference to a sequence chart shown in FIG. 11. In order to instruct switching to the external operation mode, an SCSI command is used. In the SCSI specification, a command area that a manufacturer can independently use is provided. Therefore, the manufacturer can define a command for instructing switching to the external operation mode using this command area. It is possible to instruct switching to the external operation mode by using the command defined in this way as the operation mode switching order.

In a state in which the information processing terminal 10 is connected, when the operation unit 27 of the host device 20 is used by the user and operation for instructing switching to the external operation mode is performed, the CPU 21 of the host device 20 receives an instruction for switching to the external operation mode by the operation (step SB110). Then, this CPU 21 transmits a command for instructing switching to the external operation mode to the information processing terminal 10 (step SB120). When the command for instructing switching to the external operation mode is transmitted from the host device 20, the CPU 11 of the information processing terminal 10 receives the command using the USB controller 16 and switches the operation mode of the information processing terminal 10 to the external operation mode (step SB130).

As an order for processing performed by the host device 20, in the same manner as described above, the SCSI command defined by the manufacturer is used. For example, if an SCSI command for ordering page turn-over processing for causing the display unit 18 of the information processing terminal 10 to display content data D of the next page is defined by the manufacturer, it is possible to perform page turn-over by using the SCSI command for the order for processing. In other words, the manufacturer can order arbitrary processing from the host device 20 and cause the information processing terminal 10 to execute the processing by defining the SCSI command.

As described above, in the external operation mode, the information processing terminal 10 executes the processing ordered by the host device 20. For example, in this external operation mode, when the operation unit 27 of the host device 20 is used by the user and the operation for instructing the page turn-over processing is performed, the CPU 21 of the host device 20 receives the instruction for the processing by the operation by the user (step SB140). Then, this CPU 21 transmits a command for ordering the page turn-over processing designated by the operation to the information processing terminal 10 (step SB150). When the command for ordering the processing is transmitted from the host device 20, the CPU 11 of the information processing terminal 10 executes the page turn-over processing ordered by the command (step SB160).

Figure 12:
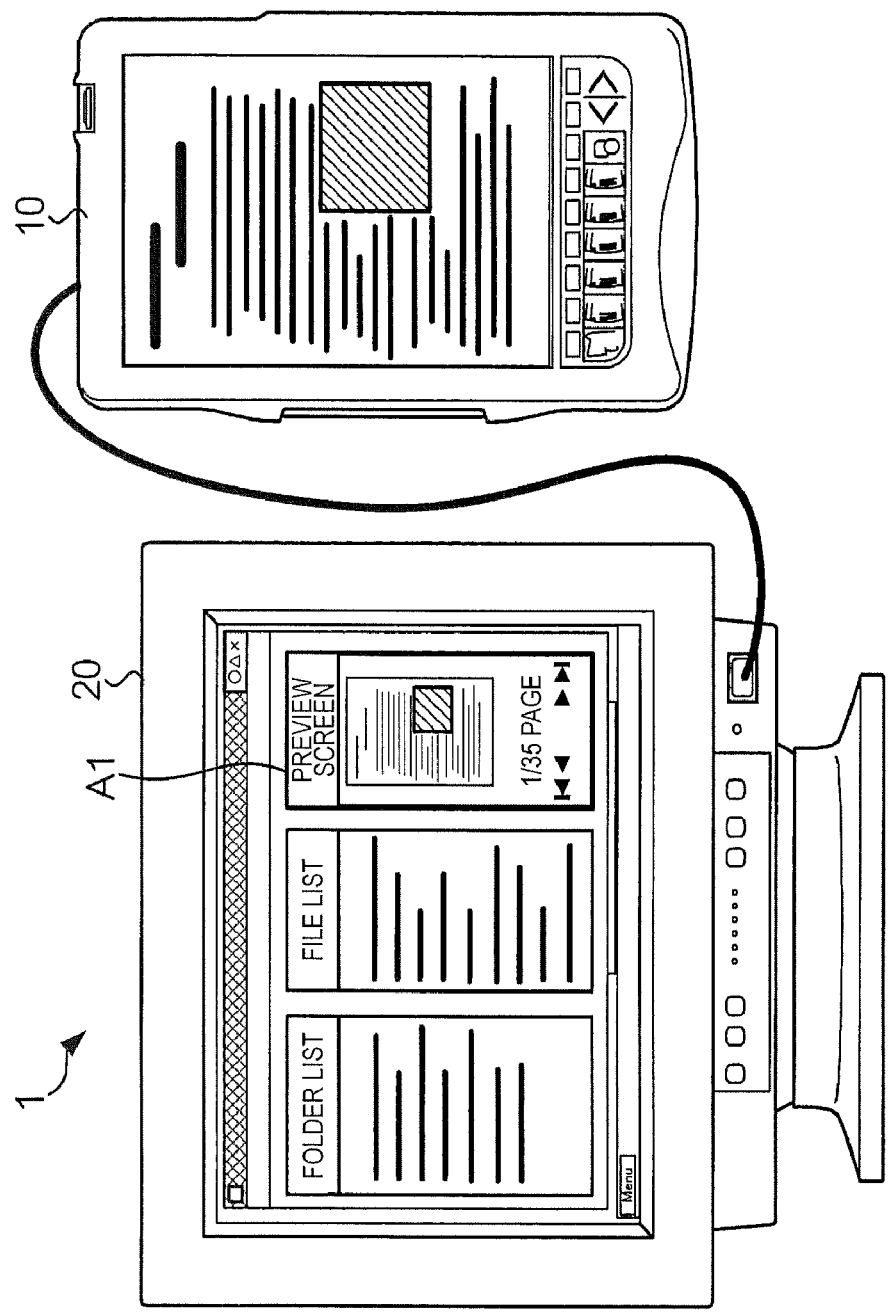
FIG. 12 is a diagram showing a screen for receiving operation for ordering processing.

FIG. 12 is a diagram showing a screen for receiving operation for instructing the information processing terminal 10 to perform processing. The CPU 21 of the host device 20 executes processing order software, whereby this screen is displayed on the display unit 28 of the host device 20. For example, when certain content data D is displayed on the display unit 18 of the information processing terminal 10, the CPU 21 causes the display unit 28 to display a preview image representing contents of the content data D in an area A1 in this screen and receives operation for instructing the information processing terminal 10 to perform processing using the content data D. When the operation unit 27 of the host device 20 is operated by the user and the page turn-over processing is instructed on this screen, as described above, the CPU 21 of the host device 20 transmits a command for ordering the page turn-over processing to the information processing terminal 10. When the command for ordering the processing is transmitted from the host device 20, the CPU 11 of the information processing terminal 10 causes the display unit 18 to display the content data D of the next page according to an order of the command. Consequently, the content data D of the next page is displayed on the display unit 18 of the information processing terminal 10.

Subsequently, operations in the mass-storage mode are explained with reference to a sequence chart shown in FIG. 13. When the operation unit 27 of the host device 20 is used by the user and operation for instructing switching from an operation mode (the connected mode or the external operation mode) other than the mass-storage mode to the mass-storage mode is performed, the CPU 21 of the host device 20 receives the instruction for switching to the mass-storage mode by the operation (step SC100). The CPU 21 transmits a command for instructing switching to the mass-storage mode to the information processing terminal 10 as an operation mode switching order (step SC110).

When the command for instructing switching to the mass-storage mode is transmitted from the host device 20, the CPU 11 of the information processing terminal 10 receives the command using the USB controller 16 and, first, writes cache data stored in the RAM 12 in the flash ROM 13 (step SC120). In this RAM 12, cache data that is a result of processing executed by the CPU 11 is temporarily stored. The cache data stored in the RAM 12 is written in the flash ROM 13 at predetermined timing. For example, when processing for adding tag information representing a tag to certain content data D is executed by the CPU 11, the content data D is invoked to the RAM 12 and the tag information is added in the RAM 12. Therefore, in this RAM 12, the content data D added with the tag information as the cache data is stored. In this way, the tag information is added to the content data D stored in the RAM 12. However, since there is a time difference until a state of the content data D is reflected on the flash ROM 13, in a certain period, this tag information is not added to the content data D stored in the flash ROM 13.

In other words, when the CPU 11 writes data in the flash ROM 13, in general, delay writing is performed by using the RAM 12 as a cache. Since, in general, speed of access to the RAM 12 is higher than speed of access to the flash ROM 13, contents frequently written are subjected to change or update processing on the RAM 12 and, after the processing is finished, the contents are read out from the RAM 12 and written in the flash ROM 13. When, for example, a hard disk is used instead of the flash ROM 13, this hard disk is a block device that cannot be accessed bit by bit and read and written for each block size. Therefore, the CPU 11 needs to store the data on the RAM 12 until the fixed block size is obtained. Because of such circumstances, the RAM 12 is used as a cache. However, unless the contents cached in the RAM 12 are written in the flash ROM 13, inconsistency occurs in the file system that manages the flash ROM 13. In the USB terminal in the past, an operation mode is switched according to presence or absence of connection between the USB terminal and the host device. Therefore, when processing for removing the USB terminal from the host device is performed, processing for writing cache data stored in a RAM to a flash ROM is performed. On the other hand, in this embodiment, it is possible to shift the operation mode without removing the USB connector 15 of the information processing terminal 10 from the USB port 25 of the host device 20 and change a management entity of the file system in the flash ROM 13 to the CPU 10 of the information processing terminal 10 or the CPU 21 of the host device 20. Therefore, before shifting to the mass-storage mode, processing for reflecting the cache data stored in the RAM 12 on the content data D of the flash ROM 13 is necessary.

Subsequently, the CPU 11 of the information processing terminal 10 writes work data stored in the RAM 12 in the flash ROM 13 (step SC130). This work data is information representing a work state immediately before the operation mode of the information processing terminal 10 is switched from the operation mode other than the mass-storage mode to the mass-storage mode. The work data is, for example, a file name and a page number of contents displayed on the display unit 18 when the user attempts to write the work data in the flash ROM 13 or an operation history of the operation unit 17. In other words, the work data is a history of processing executed by the CPU 11. By performing processing for saving such work data, even if the operation mode of the information processing terminal 10 is switched from the operation mode other than the mass-storage mode to the mass-storage mode and stored contents of the RAM 12 are rewritten by the host device 20, when the operation mode of the information processing terminal 10 is switched from the mass-storage mode to another operation mode (the connected mode or the external operation mode), it is possible to restore a work state immediately before the operation mode is switched to the mass-storage mode.

After writing the data of the RAM 12 in the flash ROM 13, the CPU 11 of the information processing terminal 10 switches the operation mode of the information terminal 10 to the mass-storage mode (step SC140). As described above, in the mass-storage mode, the information processing terminal 10 accepts access to the flash ROM 13 by the host device 20.

Figure 14C:
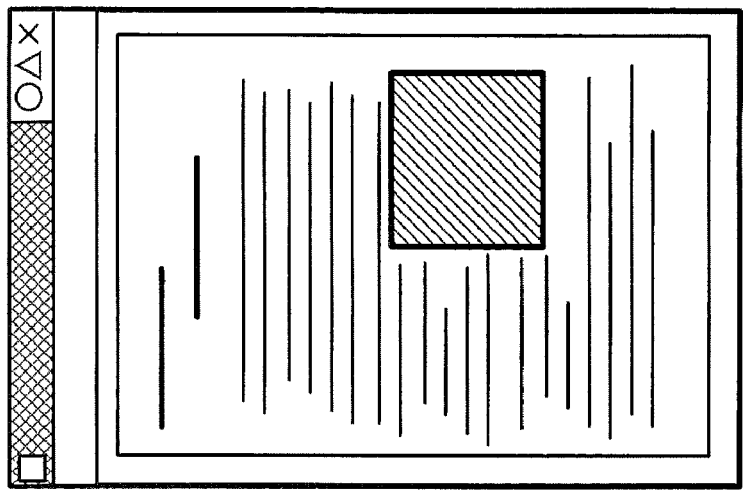
FIGS. 14A, 14B, and 14C are diagrams showing transition of a screen in accessing the flash ROM 13.
Figure 14B:
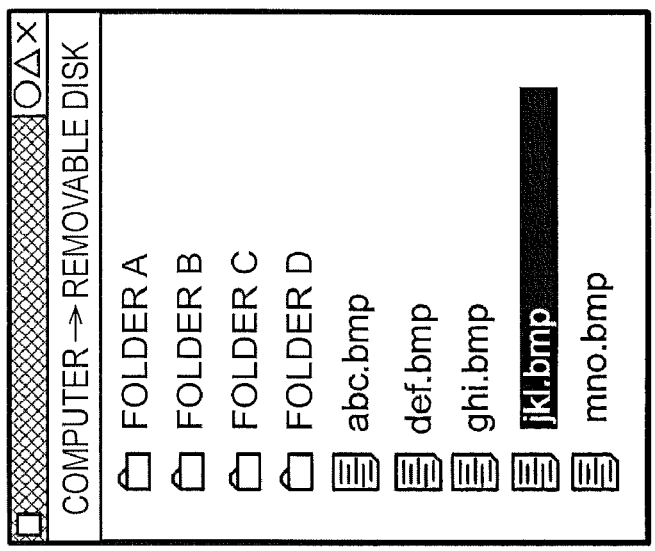
Figure 14A:
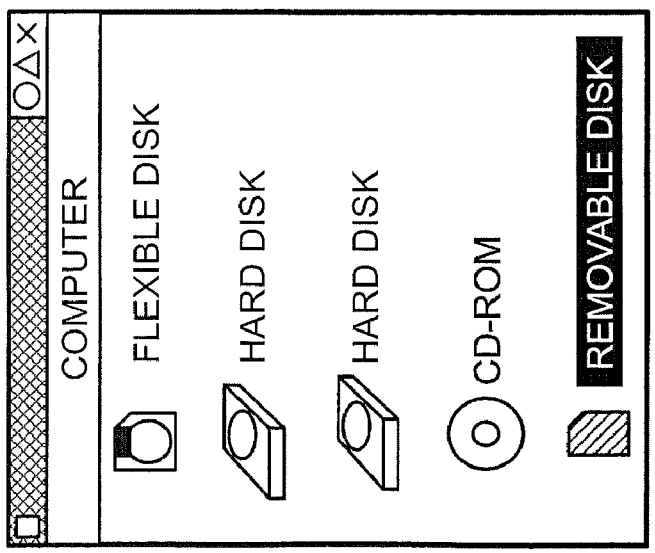

Here, FIG. 14 is a diagram showing transition of a screen displayed on the display unit 28 of the host device 20 when the CPU 21 of the host device 20 accesses the flash ROM 13 of the information processing terminal 10. FIG. 14A is a diagram showing a screen for managing a device connected to the host device 20. On this screen, the information processing terminal 10 is displayed as a "removable disk". When the operation unit 27 of the host device 20 is operated by the user and access to the flash ROM 13 of the information processing terminal 10 is instructed on this screen, a screen shown in FIG. 14B is displayed. On this screen, a file name list of the content data D stored in the flash ROM 13 of the information processing terminal 10 is displayed. When the operation unit 27 is operated by the user and display of the content data D with a file name "jkl.bmp" is instructed on this screen, software for displaying this content data D is executed by the CPU 21 and a screen shown in FIG. 14C is displayed. On this screen, an image representing the content data D with the file name "jkl.bmp" is displayed.

Figure 13:
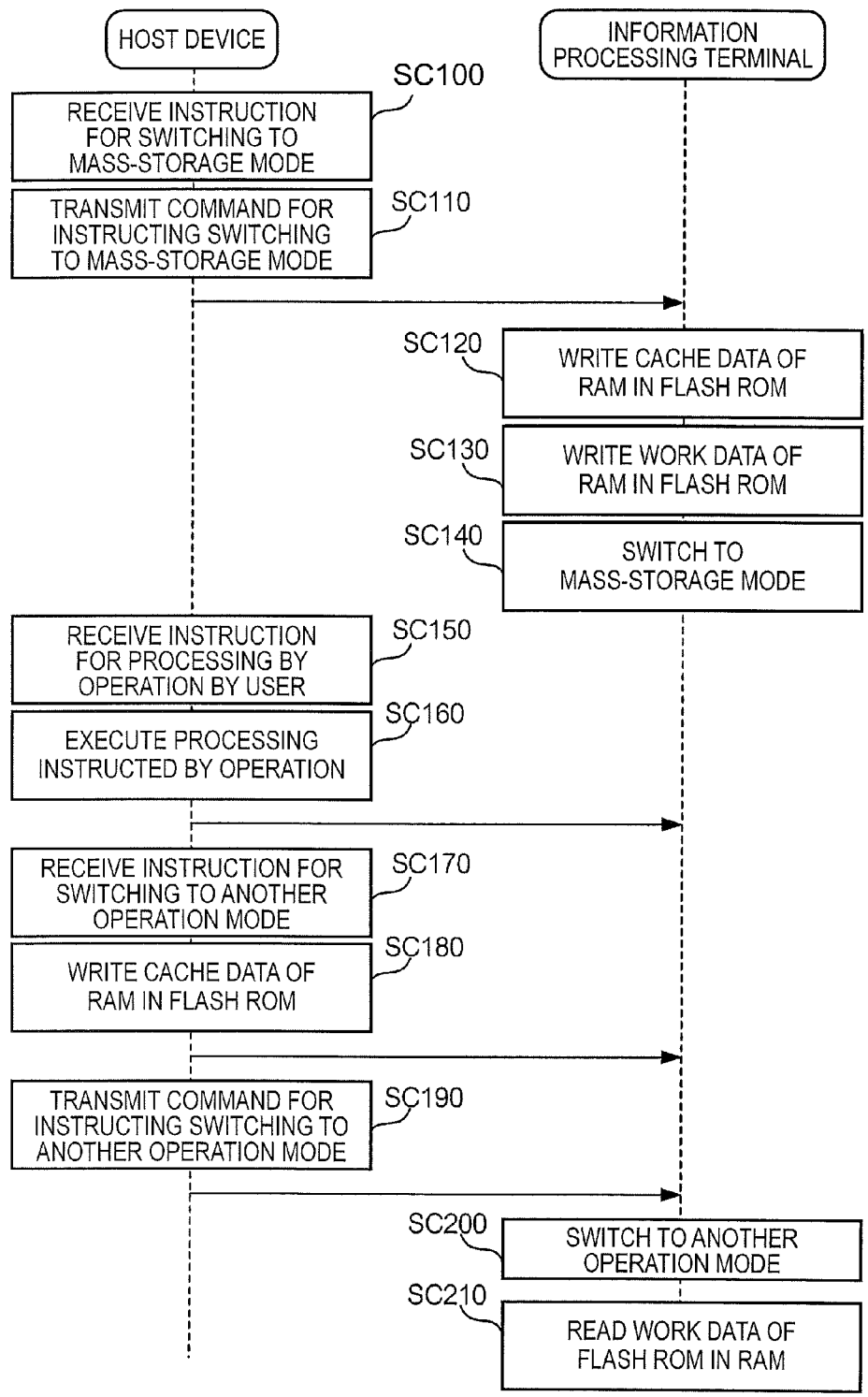
FIG. 13 is a sequence chart showing operations in the mass-storage mode.
Figure 15:
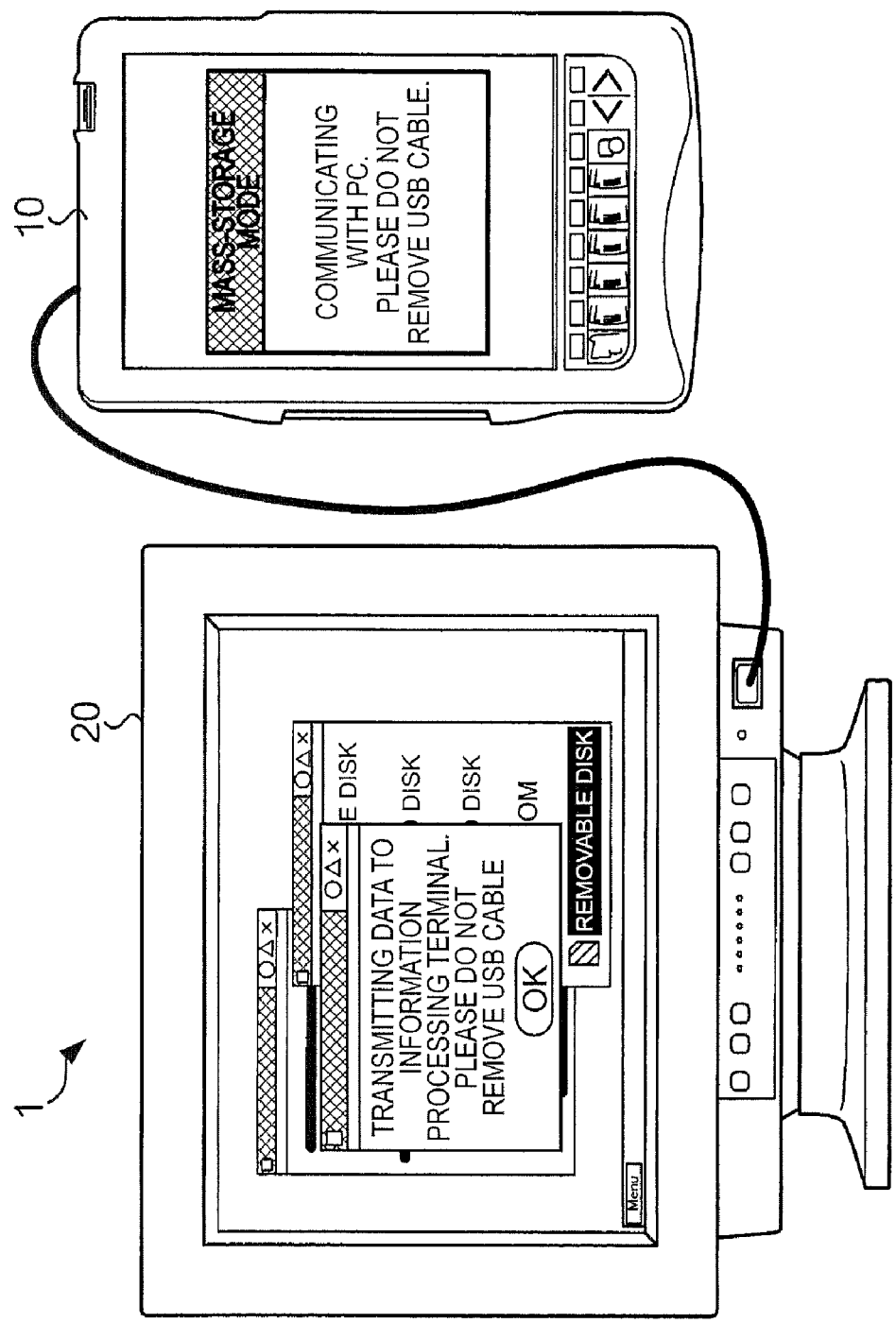
FIG. 15 is a diagram showing a screen displayed during transmission of content data.

When the operation unit 27 of the host device 20 is used by the user and, for example, operation for instructing processing for adding content data "pqr.bmp" to the flash ROM 13 of the information processing terminal 10 is performed on the screen shown in FIG. 14B, the CPU 21 of the host device 20 receives the instruction for the processing by the operation by the user (step SC150 in FIG. 13). Then, this CPU 21 executes processing for accessing the flash ROM 13 of the information processing terminal 10 and adding the content data "pqr.bmp" instructed by the operation (step SC160). FIG. 15 is a diagram showing screens displayed on the display unit 28 of the host device 20 and the display unit 18 of the information processing terminal 10. On the display unit 28 of the host device 20, a message "transferring data to information processing terminal" indicating that content data is being transmitted is displayed. Similarly, on the display unit 18 of the information processing terminal 10, a message "communicating with PC" indicating that the content data is being transmitted from the host device 20 is displayed. Consequently, the content data "pqr.bmp" is added to the flash ROM 13 of the information processing terminal 10.

When the operation mode of the information processing terminal 10 is the mass-storage mode, when the operation unit 27 of the host device 20 is used by the user and operation for instructing switching from the mass-storage mode to another operation mode is performed, the CPU 21 of the host device 20 receives an instruction for switching to the another operation mode by the operation (step SC170 in FIG. 13). The another operation mode referred to here is the connected mode or the external operation mode. Next, first, the CPU 21 of the host device 20 writes the cache data temporarily stored in the RAM 22 in the flash ROM 13 (step SC180). In this RAM 22, in the same manner as described above, cache data that is a result of processing executed by the CPU 21 is stored. For example, when processing for changing contents of certain content data D is executed by the CPU 21, the content data D acquired by access to the flash ROM 13 is invoked to the RAM 22 and the contents are changed in the RAM 22. Therefore, in this RAM 22, the content data D, the contents of which are changed as a result of the processing, is stored. The contents of the content data D stored in the RAM 22 in this way are changed. However, since there is a time difference until a state of the content data D is reflected on the flash ROM 13, the contents of the content data D stored in the flash ROM 13 may be unchanged from those before the change. Therefore, processing for reflecting the cache data stored in the RAM 22 on the content data D of the flash ROM 13 is necessary.

After writing the cache data of the RAM 22 in the flash ROM 13, the CPU 21 of the host device 20 transmits a command for instructing switching to another operation mode to the information processing terminal 10 as an operation mode switching order (step SC190). When the command for instructing switching to another operation mode is transmitted from the host device 20, the CPU 11 of the information processing terminal 10 receives the command using the USB controller 16 and switches the operation mode of the information processing terminal 10 from the mass-storage mode to the another operation mode (step SC200).

Then, the CPU 11 of the information processing terminal 10 reads the work data written in the flash ROM 13 in step SC130 in the RAM 12 (step SC210). Consequently, the display contents displayed on the display unit 18 before the operation mode is switched to the mass-storage mode, i.e., a page image specified by the file name and the page number written in the flash ROM 13 in step SC130 is displayed on the display unit 18 again. Moreover, a history of operation performed before the operation mode is switched to the mass-storage mode is restored.

For example, when the operation mode of the information processing terminal 10 is switched from the mass-storage mode to the connected mode in step SC200, as described above, the CPU 11 of the information processing terminal 10 executes processing instructed by operation received by the operation unit 17 of the information processing terminal 10. Therefore, for example, when the user operates the operation unit 17 of the information processing terminal 10 and instructs processing for displaying the content data D "pqr.bmp" added to the flash ROM 13 on the display unit 18, the CPU 11 causes the display unit 18 to display this content data D.

When the connection between the information processing terminal 10 and the host device 20 is cut and the USB connector 15 of the information processing terminal 10 is removed from the USB port 25 of the host device 20, the information processing terminal 10 and the host device 20 operate alone, respectively. In other words, the CPU 21 of the host device 20 executes processing instructed by operation received by the operation unit 27 and the CPU 11 of the information processing terminal 10 executes processing instructed by operation received by the operation unit 17 using the content data D stored in the flash ROM 13.

According to the embodiment explained above, since the information processing terminal 10 operates in the connected mode, even in a state in which the information processing terminal 10 is connected to the host device 20, it is possible to execute processing corresponding to operation by the user on the information processing terminal 10.

[Modification]

The above is the explanation of the embodiment. Contents of this embodiment can be modified as described below. Respective forms described below may be appropriately combined.

(1) In the embodiment described above, the information processing terminal 10 and the host device 20 are connected according to the USB standard. However, the information processing terminal 10 and the host device 20 may be connected to be capable of communicating with each other according to IEEE 1394. In this case, in the information processing terminal 10, an interface complying with IEEE 1394 detachably attachable to the host device 20 and a controller that communicates with the host device 20 according to IEEE 1394 are provided. In the host device 20, a connection port to which the interface of the information processing terminal 10 is connected and a controller that communicates with the information processing terminal 10 according to IEEE 1394 are provided. With this configuration, an effect same as that of the embodiment described above is obtained.

(2) In the embodiment described above, the information processing terminal 10 operates in the operation mode of any one of the connected mode, the external operation mode, or the mass-storage mode in a state in which the information processing terminal 10 is connected to the host device 20. On the other hand, the information processing terminal 10 may operate in the operation mode of the connected mode or the mass-storage mode in a state in which the information processing terminal 10 is connected to the host device 20.

(3) In the embodiment described above, switching to the external operation mode and the mass-storage mode is performed according to an instruction of a command transmitted from the host device 20 on the basis of operation by the user received by the operation unit 27 of the host device 20. On the other hand, switching from the connected mode or the external operation mode to another operation mode may be performed on the basis of operation of the operation unit 17 of the information processing terminal 10 by the user.

(4) In the embodiment described above, the example in which the host device 20 is the personal computer and the information processing terminal 10 is the display device called electronic paper is cited and explained. However, the present invention is not limited to this. For example, the information processing terminal 10 described above may be a portable music player or a digital camera. Moreover, for example, when the information processing terminal 10 is the portable music player, the content data D stored in the flash ROM 13 may be sound data used for reproducing music. When the information processing terminal 10 is the digital camera, the content data D may be image data for displaying a picked-up image. Therefore, unit that outputs a result of processing executed by the information processing terminal 10 and the host device 20 is not limited to display unit such as the display unit 18 and the display unit 28 and may be reproducing unit that reproduces the result of the processing as sound or writing unit that writes the result of the processing in a recording medium.

(5) In the embodiment described above, processing corresponding to operation received by the operation unit 17 is not executed in the external operation mode. On the other hand, if the processing corresponding to the operation received by the operation unit 17 does not conflict with processing ordered by a command transmitted from the host device 20 and does not cause inconsistency or breakage of data stored in the flash ROM 13, the CPU 11 of the information processing terminal 10 at the time of the external operation mode may execute the processing corresponding to the operation received by the operation unit 17.

(6) In the embodiment described above, the external operation mode for executing processing ordered by operation received by the operation unit 27 of the host device 20 is provided. In the connected mode, the processing ordered by the operation received by the operation unit 27 of the host device 20 is not executed. On the other hand, the CPU 11 of the information processing terminal 10 at the time of the connected mode may execute the processing ordered by the operation received by the operation unit 27 of the host device 20. In this case, in a state in which the information processing terminal 10 is connected to the host device 20, the information processing terminal 10 operates in the two operation modes, i.e., the connected mode and the mass-storage mode.

(7) In the embodiment described above, transition of the operation mode may be limited between the mass-storage mode and the external operation mode. For example, the transition of the operation mode is allowed between the connected mode and the mass-storage mode and between the connected mode and the external operation mode and direct transition of the operation mode is disallowed between the mass-storage mode and the external operation mode. This is because, depending on transition between the operation modes, it is likely that contents of the flash ROM are rewritten and consistency of data cannot be maintained after return from the transition between the operation modes.

For example, when the operation unit 27 of the host device 20 is operated by the user and switching from the mass-storage mode to the external operation mode is instructed, the information processing terminal 10 may switch the operation mode of the information processing terminal 10 itself from the mass-storage mode to the connected mode once and, then, switch the operation mode to the external operation mode. Consequently, although the operation mode does not directly transition from the mass-storage mode to the external operation mode actually, it is possible to show the operation mode to the user as if the operation mode directly transitions from the mass-storage mode to the external operation mode.

(8) In the embodiment described above, programs executed by the CPU 11 of the information processing terminal 10 or the CPU 21 of the host device 20 can be provided in a state in which the programs are recorded in storage media such as a magnetic tape, a magnetic disk, a flexible disk, an optical recording medium, a magneto-optical recording medium, a CD (Compact Disk), a DVD (Digital Versatile Disk), and a flash ROM.

The entire disclosure of Japanese Patent Application Nos. 2007-099390 filed on Apr. 5, 2007 and 2007-175369 filed on Jul. 3, 2007 are expressly incorporated by reference herein.

What is claimed is:

1. An information processing system comprising:
a host device that transmits an order according to a USB (Universal Serial Bus) standard; and
an information processing terminal that responds to the order, which is transmitted from the host device, according to the USB standard, characterized in that
the information processing terminal includes:
a storing unit that stores data;
a first operation unit that receives a first user input indicating a first instruction for processing;
a receiving unit that receives the order transmitted from the host device according to the USB standard;
an operation-mode switching unit that switches, when the receiving unit receives an operation mode switching order for ordering the information processing terminal to switch an operation mode of the information processing terminal itself in a state in which the information processing terminal is connected to the host device, the operation mode of the information processing terminal to a first operation mode, a second operation mode, or a third operation mode according to the operation mode switching order;
a first processing unit that executes, in the first operation mode, the first instruction for processing indicated by the first user input using the data stored in the storing unit and does not execute, in the second operation mode and in the third operation mode, the first instruction for processing indicated by the first user input, the first processing unit performing management of a file system of the storing unit while in the first operation mode; and
a first outputting unit that outputs a result of executing the first instruction for processing by the first processing unit, and
the host device includes:
a second operation unit that receives a second user input indicating a second instruction for processing;
a transmitting unit that transmits, when the host device is instructed to switch the operation mode of the information processing terminal, an operation mode switching order for ordering the information processing terminal to switch the operation mode to an instructed operation mode to the information processing terminal according to the USB standard, the instructed operation mode corresponding to the first operation mode, the second operation mode, or the third operation mode;
a second processing unit that executes the second instruction for processing indicated by the second user input, when the information processing terminal is switched to the second operation mode according to the operation mode switching order transmitted by the transmitting unit, the second processing unit using the data stored in the storing unit to execute the second instruction for processing and the second processing unit performing management of the file system of the storing unit while the information processing terminal is in second operation mode; and a second outputting unit that outputs a result of executing the second instruction for processing by the second processing unit;

the second processing unit executing the second instruction for processing indicated by the second user input, when the information processing terminal is switched to the third operation mode according to the operation mode switching order transmitted by the transmitting unit, the second processing unit using the data stored in the storing unit to execute the second instruction for processing and the first processing unit of the information terminal performing management of the file system of the storing unit while the information processing terminal is in the third operation mode.

2. An information processing system according to claim 1, characterized in that the information processing terminal includes a first primary storing unit that temporarily stores a result of executing the first instruction for processing by the first processing unit or a history of executing previous instructions processing before causing the storing unit to store the result or the history, the host device includes a second primary storing unit that temporarily stores a result of executing the second instruction for processing by the second processing unit before causing the storing unit to store the result, the first processing unit causes, when an operation mode switching order for ordering the information processing terminal to switch the operation mode of the information processing terminal to the second operation mode is received by the receiving unit, the storing unit to store the result of executing the first instruction for processing or the history stored in the first primary storing unit, the operation-mode switching unit switches, after the result of executing the first instruction for processing or the history is stored in the storing unit by the first processing unit, the operation mode of the information processing terminal to the second operation mode, the second processing unit copies, when an operation mode switching order for ordering the information processing terminal to switch the operation mode of the information processing terminal from the second operation mode to another operation mode is transmitted by the transmitting unit, the result of executing the second instruction for processing stored in the second primary storing unit to the storing unit of the information processing terminal, and the operation-mode switching unit switches the operation mode of the information processing terminal from the second operation mode to the another operation mode after the result of executing the second instruction for processing is copied to the storing unit of the information processing terminal by the second processing unit.

3. An information processing terminal that responds to an order, which is transmitted from a host device, according to a Universal Serial Bus (USB) standard, the information processing terminal comprising:

a storing unit that stores data;

an operation unit that receives a user input indicating a first instruction for processing;

a receiving unit that receives the order transmitted from the host device according to the USB standard;

an operation-mode switching unit that switches, when the receiving unit receives an operation mode switching order for ordering the information processing terminal to switch an operation mode of the information processing terminal itself in a state in which the information processing terminal is connected to the host device, the operation mode of the information processing terminal to a first operation mode, a second operation mode, or a third operation mode according to the operation mode switching order;

a first processing unit that executes, in the first operation mode, the instruction for processing indicated by the user input using the data stored in the storing unit and does not execute, in the second operation mode and in the third operation mode, the instruction for processing indicated by the user input and the first processing unit performing management of a file system of the storing unit while in the first operation mode; and an outputting unit that outputs a result of executing the instruction for processing executed by the processing unit;

the host device performing a second instruction for processing indicated by a second user input of the host device with a second processing unit of the host device, using the data stored in the storing unit to execute the second instruction for processing while the information processing terminal is in the second operation mode or the third operation mode, the second processing unit performing management of the file system of the storing unit while the information processing terminal is in the second operation mode and the first processing unit performing of the information terminal performing management of the file system of the storing unit while the information processing terminal is in the third operation mode.

4. A host device that transmits an order according to a Universal Serial Bus (USB) standard to an information processing terminal that receives a first instruction for processing, the host device comprising:

an operation unit that receives a user input indicating a second instruction for processing;

a transmitting unit that transmits, when the host device is instructed to switch an operation mode of an information processing terminal, an operation mode switching order for ordering the information processing terminal to switch the operation mode to an instructed operation mode to the information processing terminal according to the USB standard, the instructed operation mode corresponding to a first operation mode, a second operation mode, or a third operation mode, a first processing unit of the information processing terminal executing the first instruction for processing using data stored in a storing unit of the information processing terminal when the information processing terminal is in a first operation mode and the first processing unit performing management of a file system of the information processing terminal while in the first operation mode;

a second processing unit that executes the second instruction for processing, when processing for the storing unit of the information processing terminal is switched to the second operation mode or the third operation mode and for not executing the first instruction for processing indicated by the user input in the information processing terminal according to the operation mode switching order transmitted by the transmitting unit, the second processing unit using data stored in the storing unit to execute the second instruction for processing, the second processing unit performing management of the file system of the storing unit while the information processing terminal is in the second operation mode and the first processing unit of the information terminal performing management of the file system of the storing unit while the information processing terminal is in the third operation mode; and an outputting unit that outputs a result of executing the instruction for processing by the processing unit.

5. An information processing system comprising:

a host device that transmits an order according to a USB (Universal Serial Bus) standard; and an information processing terminal that responds to the order, which is transmitted from the host device, according to the USB standard, characterized in that the information processing terminal includes:

a storing unit that stores data;

a first operation unit that receives a first user input indicating a first instruction for processing;

a receiving unit that receives the order transmitted from the host device according to the USB standard;

an operation-mode switching unit that switches, when the receiving unit receives an operation mode switching order for ordering the information processing terminal to switch an operation mode of the information processing terminal itself in a state in which the information processing terminal is connected to the host device, the operation mode of the information processing terminal to a first operation mode or a second operation mode according to the operation mode switching order;

a first processing unit that executes, in the first operation mode, the first instruction for processing indicated by the first user input using the data stored in the storing unit and does not execute, in the second operation mode, the first instruction for processing indicated by the first user input; and a first outputting unit that outputs a result of executing the first instruction for processing by the first processing unit, and the host device includes:

a second operation unit that receives a second user input indicating a second instruction for processing;

a transmitting unit that transmits, when the host device is instructed to switch the operation mode of the information processing terminal, an operation mode switching order for ordering the information processing terminal to switch the operation mode to an instructed operation mode to the information processing terminal according to the USB standard;

a second processing unit that executes the second instruction for processing indicated by the second user input, when the information processing terminal is switched to the second operation mode according to the operation mode switching order transmitted by the transmitting unit, the second processing unit using the data stored in the storing unit to execute the second instruction for processing; and a second outputting unit that outputs a result of executing the second instruction for processing by the second processing unit;

the information processing terminal including a first primary storing unit that temporarily stores a result of executing the first instruction for processing by the first processing unit or a history of executing previous instructions processing before causing the storing unit to store the result or the history;

the host device including a second primary storing unit that temporarily stores a result of executing the second instruction for processing by the second processing unit before causing the storing unit to store the result;

the first processing unit causing, when an operation mode switching order for ordering the information processing terminal to switch the operation mode of the information processing terminal to the second operation mode is received by the receiving unit, the storing unit to store the result of executing the first instruction for processing or the history stored in the first primary storing unit;

the operation-mode switching unit switching, after the result of executing the first instruction for processing or the history is stored in the storing unit by the first processing unit, the operation mode of the information processing terminal to the second operation mode;

the second processing unit copying, when an operation mode switching order for ordering the information processing terminal to switch the operation mode of the information processing terminal from the second operation mode to another operation mode is transmitted by the transmitting unit, the result of executing the second instruction for processing stored in the second primary storing unit to the storing unit of the information processing terminal; and the operation-mode switching unit switching the operation mode of the information processing terminal from the second operation mode to the another operation mode after the result of executing the second instruction for processing is copied to the storing unit of the information processing terminal by the second processing unit.

* * * * *